(12) United States Patent
Wang et al.

(10) Patent No.: US 11,055,852 B2
(45) Date of Patent: Jul. 6, 2021

(54) FAST AUTOMATIC TRIMAP GENERATION AND OPTIMIZATION FOR SEGMENTATION REFINEMENT

(71) Applicant: Nokia Technologies Oy, Espoo (FI)

(72) Inventors: Tinghuai Wang, Tampere (FI); Lingyu Zhu, Tampere (FI)

(73) Assignee: Nokia Technologies Oy, Espoo (FI)

( * ) Notice: Subject to any disclaimer, the term of this patent is extended or adjusted under 35 U.S.C. 154(b) by 187 days.

(21) Appl. No.: 16/276,828

(22) Filed: Feb. 15, 2019

(65) Prior Publication Data

US 2020/0265582 A1    Aug. 20, 2020

(51) Int. Cl.
*G06T 7/12*        (2017.01)
*G06T 7/90*        (2017.01)
*G06T 5/40*        (2006.01)

(52) U.S. Cl.
CPC ............... *G06T 7/12* (2017.01); *G06T 5/40* (2013.01); *G06T 7/90* (2017.01); *G06T 2207/20084* (2013.01)

(58) Field of Classification Search
CPC .... G06T 7/12; G06T 7/90; G06T 5/40; G06T 2207/20084
See application file for complete search history.

(56) References Cited

U.S. PATENT DOCUMENTS

| | | | | |
|---|---|---|---|---|
| 2010/0128927 A1* | 5/2010 | Ikenoue | ............. | G06K 9/00261 382/103 |
| 2015/0104106 A1* | 4/2015 | Elinas | ...................... | G06K 9/48 382/201 |
| 2017/0358092 A1* | 12/2017 | Bleibel | ..................... | G06T 7/11 |

* cited by examiner

*Primary Examiner* — Kenny A Cese
(74) *Attorney, Agent, or Firm* — Harrington & Smith

(57) ABSTRACT

In an exemplary embodiment, the present invention is an apparatus which includes at least one processor, and at least one memory including computer program code. The at least one memory and the computer program code are configured, with the at least one processor, to cause the apparatus to perform obtaining an image for segmentation; forming a trimap of at least a portion of the image, the trimap comprising a three-region map having a definite foreground, a definite background, and an unknown region separating the foreground and the background, said unknown region initially having a preselected width; in a plurality of iterations, changing the width of the unknown region; for each of the plurality of iterations, determining a quality measure; and selecting the width for the unknown region having the best quality measure. The apparatus may also include at least one camera for obtaining the image for segmentation.

18 Claims, 7 Drawing Sheets

FAST AUTOMATIC TRIMAP GENERATION AND OPTIMIZATION FOR SEGMENTATION REFINEMENT

TECHNICAL FIELD

The present invention relates to image processing, and, more specifically, relates to trimap generation in image segmentation.

BACKGROUND

This section is intended to provide a background or context to the invention disclosed below. The description herein may include concepts that could be pursued, but are not necessarily ones that have been previously conceived, implemented, or described. Therefore, unless otherwise explicitly indicated herein, what is described in this section is not prior art to the description in this application, and is not admitted to be prior art by inclusion in this section.

Despite the significant improvements of deep-learning-based segmentation algorithms, the segmentation mask output of neural networks still loses fine details due to the upsampling process of low resolution predictions (8 to 32 times upsampling). The segmentation quality of state-of-the-art methods does not meet the needs of end-user requirements for photo editing, object manipulation and effects-rendering applications. As a consequence, there remains a need to improve trimap generation in image segmentation.

The present invention is intended to address this need.

SUMMARY

This section contains examples of possible implementations and is not meant to be limiting.

In a first exemplary embodiment, the present invention is a method which comprises: obtaining an image for segmentation; forming a trimap of at least a portion of the image, the trimap comprising a three-region map having a definite foreground, a definite background, and an unknown region separating the foreground and the background, said unknown region initially having a preselected width; in a plurality of iterations, changing the width of the unknown region; for each of the plurality of iterations, determining a quality measure; and selecting the width for the unknown region having the best quality measure.

In a second exemplary embodiment, the present invention is an apparatus which comprises at least one processor, and at least one memory including computer program code. The at least one memory and the computer program code are configured, with the at least one processor, to cause the apparatus to perform: obtaining an image for segmentation; forming a trimap of at least a portion of the image, the trimap comprising a three-region map having a definite foreground, a definite background, and an unknown region separating the foreground and the background, said unknown region initially having a preselected width; in a plurality of iterations, changing the width of the unknown region; for each of the plurality of iterations, determining a quality measure; and selecting the width for the unknown region having the best quality measure.

In a third exemplary embodiment, an apparatus comprises: means for obtaining an image for segmentation; means for forming a trimap of at least a portion of the image, the trimap comprising a three-region map having a definite foreground, a definite background, and an unknown region separating the foreground and the background, said unknown region initially having a preselected width; means for changing the width of the unknown region in a plurality of iterations; determining a quality measure for each of the plurality of iterations; and means for selecting the width for the unknown region having the best quality measure.

In a fourth exemplary embodiment, the present invention is a computer program product comprising a non-transitory computer-readable storage medium bearing computer program code embodied therein for use with a computer. The computer program code comprises code for performing: obtaining an image for segmentation; forming a trimap of at least a portion of the image, the trimap comprising a three-region map having a definite foreground, a definite background, and an unknown region separating the foreground and the background, said unknown region initially having a preselected width; in a plurality of iterations, changing the width of the unknown region; for each of the plurality of iterations, determining a quality measure; and selecting the width for the unknown region having the best quality measure.

DETAILED DESCRIPTION OF THE DRAWINGS

The present invention provides a method to achieve fast and accurate segmentation, which facilitates object-based visual recognition, editing, manipulation and rendering.

The present invention differs from previous approaches by providing a novel approach to accomplish fast and accurate segmentation automatically and adaptively.

Specifically, in the present invention, an efficient and automatic trimap-generation method for mitigating the mis-segmentation from any segmentation algorithm is introduced. In summary, the width of the unknown region of the trimap is iteratively changed and a quality measure for each iteration is determined based on a color histogram and a count of border intersections. At the end, the trimap width with the best quality measure is selected.

Figure 1:
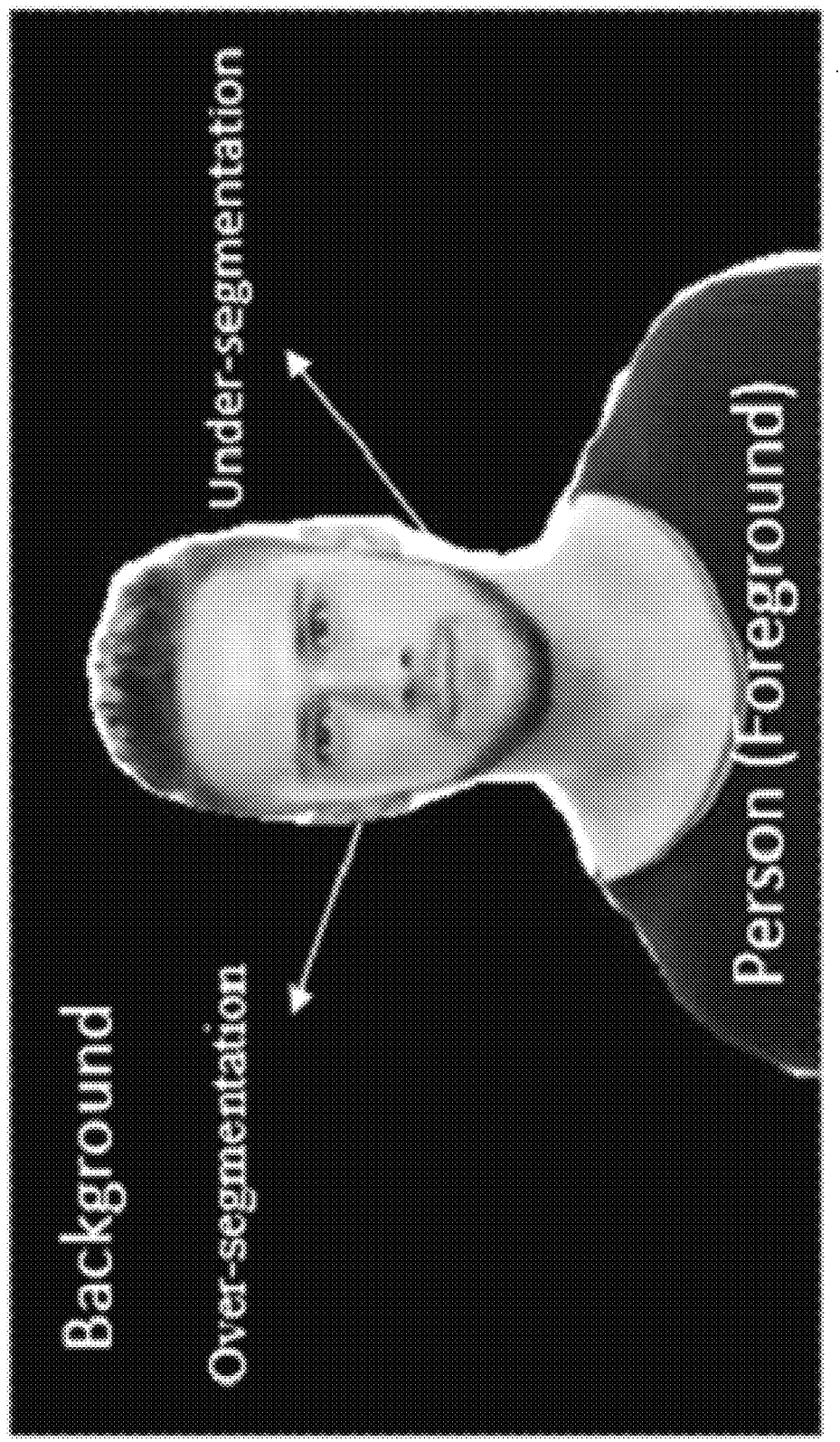
FIG. 1 shows an example of mis-segmenting a person.

An example of mis-segmenting a person is shown in FIG. 1, where the boundaries are either over- or under-segmented. Missing the true object boundary is a common issue in the state-of-the-art segmentation algorithms.

Figure 2:
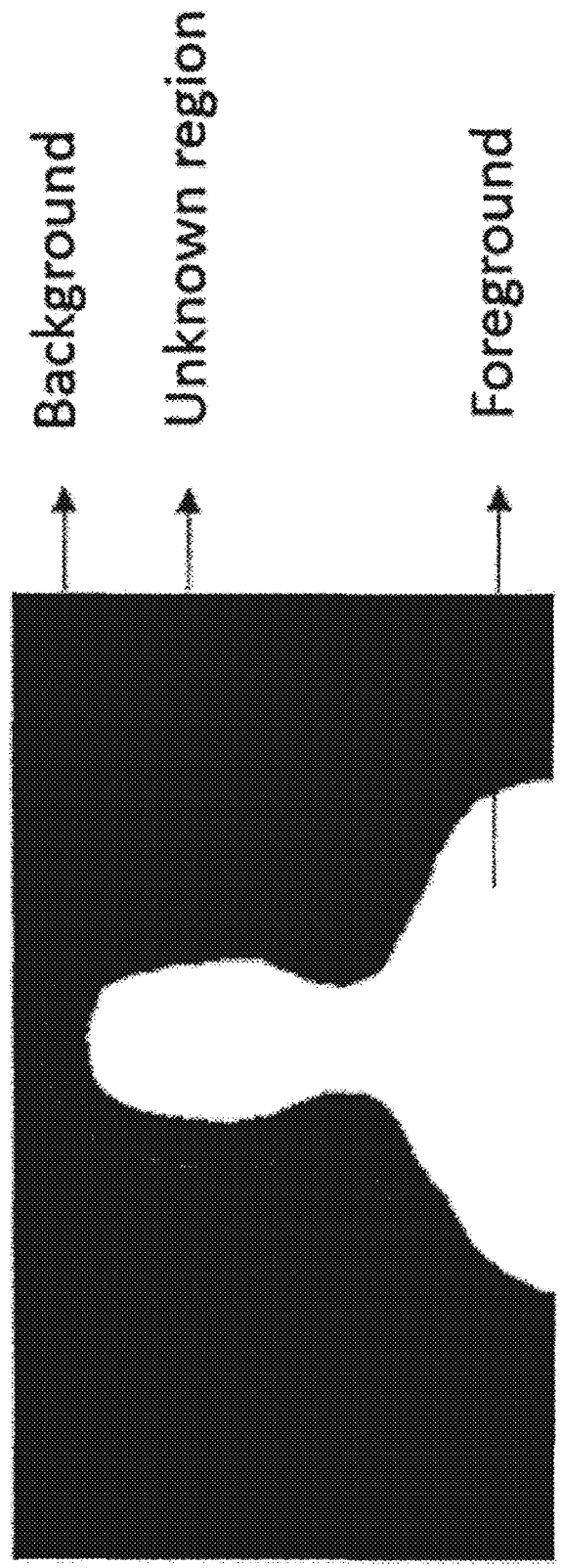
FIG. 2 is an illustration of a trimap.

Trimap is a three-region map having a definite foreground, a definite background, and an unknown region as illustrated in FIG. 2. It is traditionally generated manually in an image-matting task.

Figure 3:
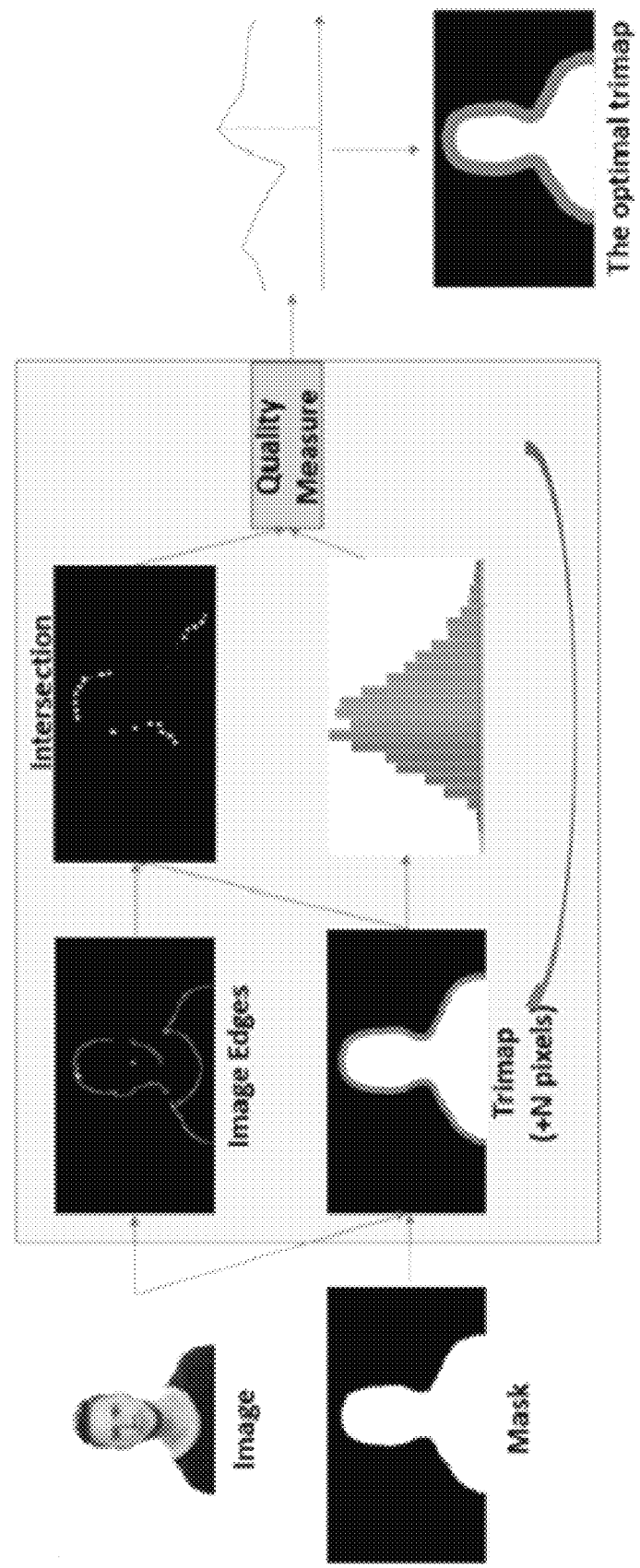
FIG. 3 is an illustration of an example of generating a trimap.

FIG. 3 is an illustration of an example of generating a trimap. The method is proposed to overcome mis-segmentation problems. The method starts by initiating a trimap with a narrow unknown region. Specifically, a 2-pixel-wide unknown region around the raw segmentation mask is created using a distance-transform algorithm. Distance transform is an operator normally applied to binary images (for example, in the present segmentation mask, "0" is the value for the background and "1" is the value for the foreground), which returns the distance to the closest boundary from each pixel. The reason that a distance-transform algorithm is adopted is to gradually expand the unknown region. Alternatives to a distance-transform algorithm can be morphological dilation and erosion methods. The unknown region is expanded gradually to cover both the mis-segmented areas as well as the true boundary. Embodiments may also be applied to one or more portions of an object or a figure. This enables one to obtain a trimap in which the unknown region may have varied width at different portions around an object. Embodiments may be also applied separately to different objects appearing in the same image. For example, determining trimaps for an image having a plurality of objects may result in having different unknown regions for a first object and a second object. For example, the width of the unknown region may be different for the first and the second object, or portions thereof.

The quality of the unknown region is measured by its texture uniformity (high uniformity indicates less mis-segmented area) and the amount of strong image edges encompassed by the region (more strong image edges indicates more true boundaries).

To measure the enclosed boundaries, a contour map, such as a Canny edge detection, or a Holistically nested Edge Detection, which includes the image edges, is generated. Canny edge detection is an image processing method used to detect edges in an image while suppressing noise. It mainly has few steps, as follows: grayscale conversion, gaussian blur, determining the intensity gradients, non-maximum suppression, double thresholding, edge tracking by hysteresis and weak edges clean up. Holistically-nested Edge Detection is a convolutional neural network-based edge detection system. It automatically predicts image boundaries by combining multi-scale and multi-level visual responses.

Figure 4:
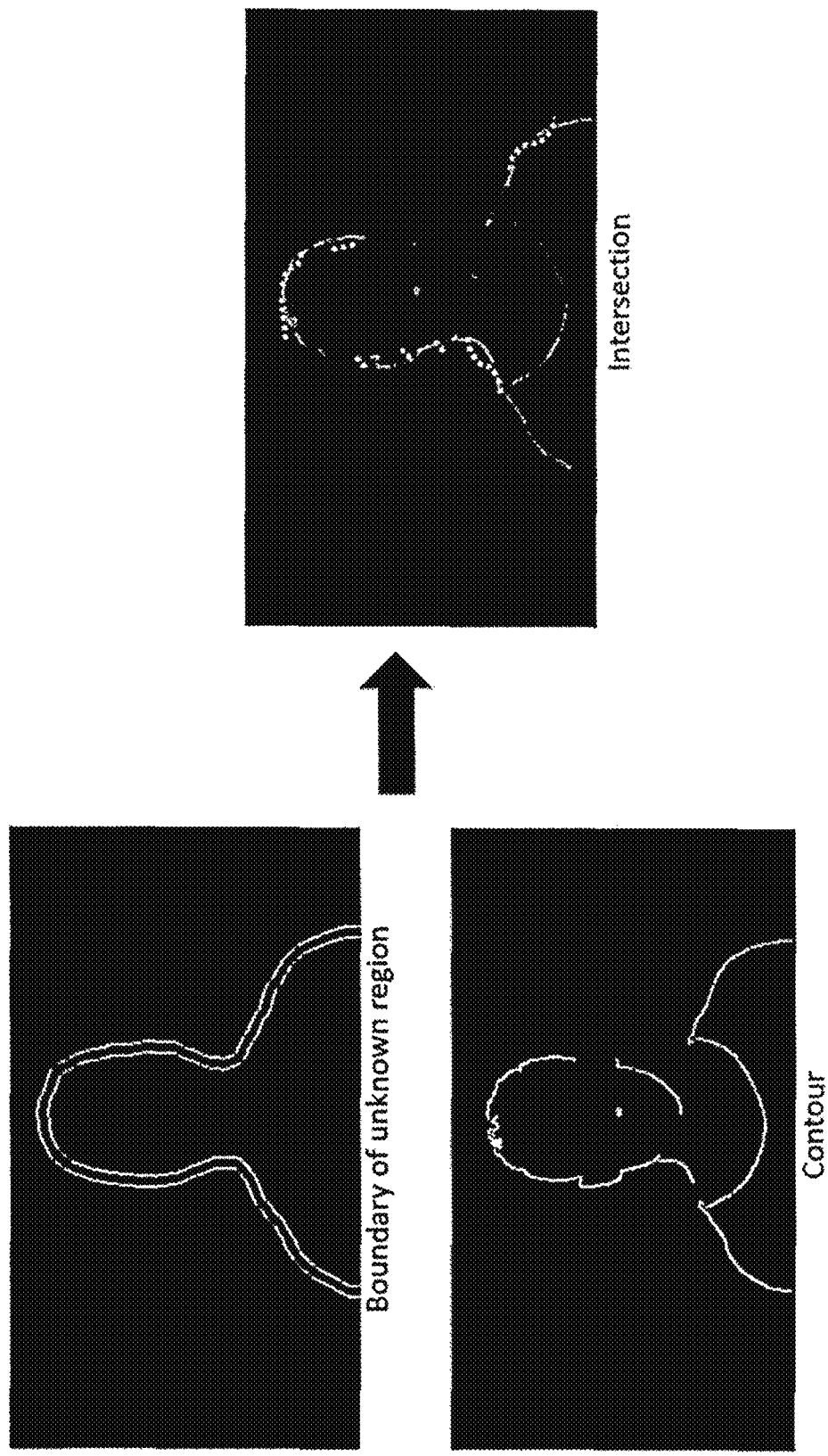
FIG. 4 shows intersections between the boundary of the uncertain region and the image edges.

The number of intersections between the boundary of the unknown region and image edges, as shown in FIG. 4, is then computed. This may be done, for example, based on an element-wise multiplication of two binary edge maps to obtain a binary map. The number of intersections may be determined, for example, based on counting the number of isolated regions in the binary map. The intersection ratio is calculated as:

$$r = \frac{N_{inter}}{N_{uncertain}}$$

where the $N_{uncertain}$ represents the pixels number on the boundary of the unknown region, and an intersection indicator may be defined, for example, as:

$$e^{-\frac{r^2}{\sigma^2}}.$$

In general, the intersection indicator may be dependent on the number of intersections or the intersection ratio r. Intersection indicator may be used as a metric for determining a quality score associated with a specific width of the unknown region. A lower intersection ratio may result in higher intersection indicator. It is beneficial to have more boundaries in the unknown region and less intersections indicates better coverage. The final quality score may be determined by combining, for example multiplying, the intersection indicator with another quality metric such as texture uniformity.

The texture uniformity is measured by calculating the normalized histogram distribution of the color image within the unknown region and its entropy. In the present disclosure, the color histogram distribution, which represents the number of pixels falling in color ranges spanning the color space of the image, is calculated. The histogram distribution is calculated by accumulating the pixels number in 20 bins, each bin is in range of [256/20*i, 256/20*(i+1)]. Then, it is normalized across all the bins. The reason for adopting a histogram distribution is to measure the amount of strong image edges (or texture uniformity) encompassed by the region, then to include the strong edges within the trimap band. Edge detection alone is an alternative approach, but it is sensitive to misdetections. In the present disclosure, the histogram distribution and edge detection are combined to do the measurement for robustness, as shown in FIG. 3.

The larger the histogram entropy, the more color variability is included in the unknown region. The histogram entropy is defined as:

$$E(H) = -\sum_{k=1}^{N} p_k \log p_k$$

where $p_k$ is the probability of the $k^{th}$ bin of the normalized histogram, which is defined as each histogram value divided by all pixels number within the trimap region. Any methods that can demonstrate the properties of histograms can be used here.

An alternative measure to entropy is the Gini index, which is defined as:

$$G(H) = 1 - \sum_{k=1}^{N} p_k^2$$

The two measurements, that is, enclosed boundaries and texture uniformity, are combined by multiplication to form the quality measure. Multiplication is a simple combination of the two quality measures, whose value increases with the increasing of histogram entropy and intersection indicator. Other combinations, such as weighted addition, can be used if the combination increases with the larger value of histogram entropy and intersection indicator. The unknown region may be enlarged iteratively with a small step (such as, two (2) pixels) until the maximum predefined width is reached, and the region with the maximum quality measure during the expansion is returned as the optimal trimap. It is, however, appreciated that selecting the width for an iteration may be done in various different ways. For example, instead of increasing the width monotonically, as in the above example, it is also possible to start with a predetermined width and decrease the width for each iteration. It is also possible to select the width randomly from a range of widths. In one embodiment, a predetermined range of widths may be first covered based on a first increment or decrement, for example eight (8) pixels. This may be followed by further iterations with a second increment or decrement, for example two (2) pixels. The second increment may be smaller than the first increment. This enables covering the predetermined width range fast with the higher increment, while increasing the resolution of widths during the further iterations.

Figure 5:
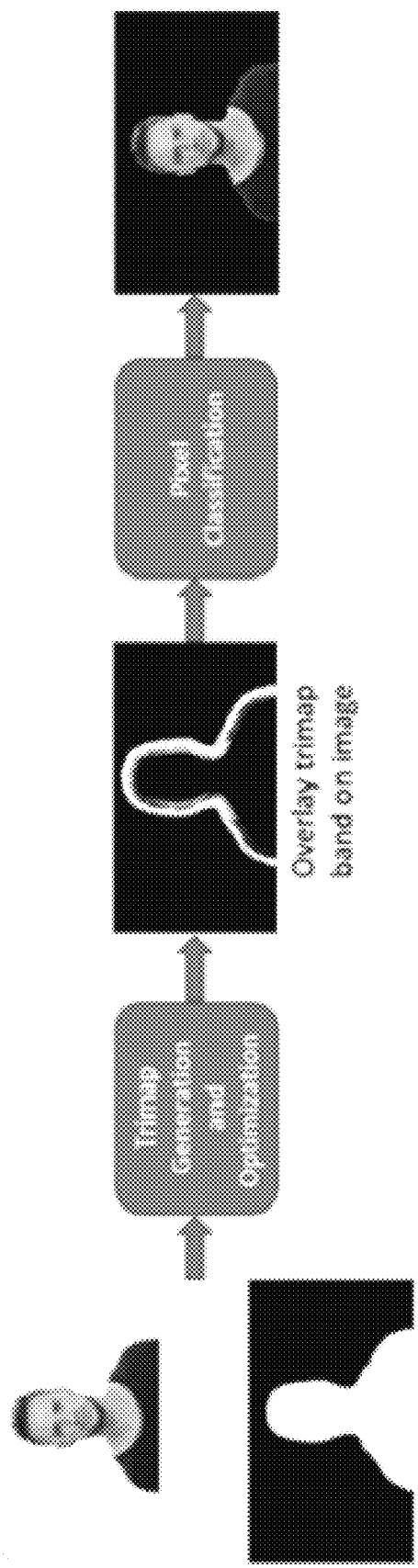
FIG. 5 shows an example of trimap band segmentation.
Figure 6:
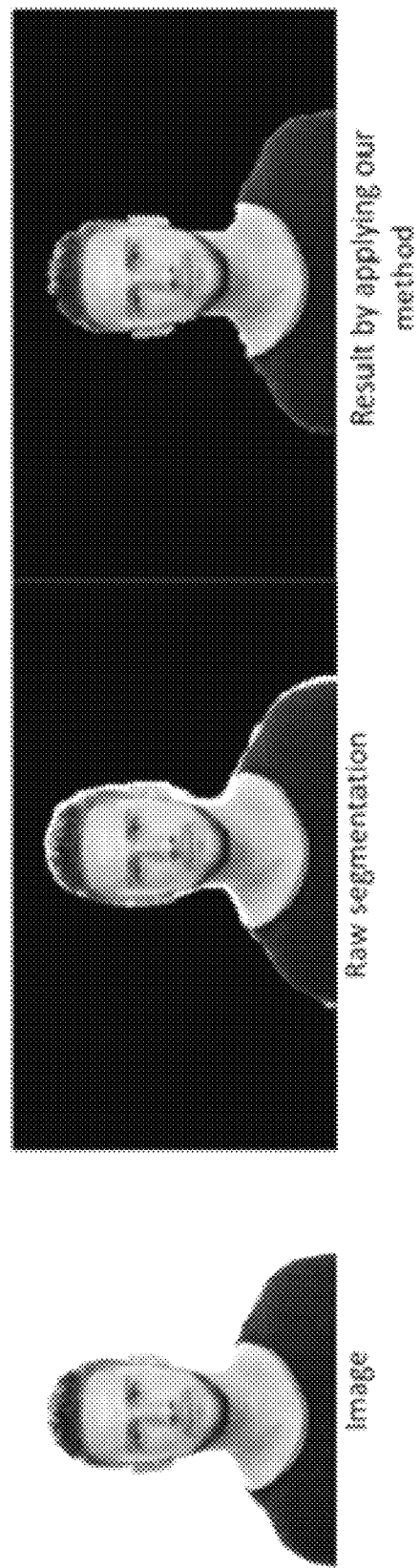
FIG. 6 shows a comparison between an original image and the result of applying an embodiment of the present method.

FIG. 5 shows an example of trimap band segmentation. For the pixels in the returned optimal unknown area, they are classified into foreground or background, as shown in FIG. 5, by seeking a shorter weighted distance from each enclosed pixel to definite foreground and definite background. In comparison, the original image, raw segmentation and the result generated by applying an example of the present method are illustrated in FIG. 6, which shows the good quality improvement of object segmentation that the present method achieves.

Figure 7:
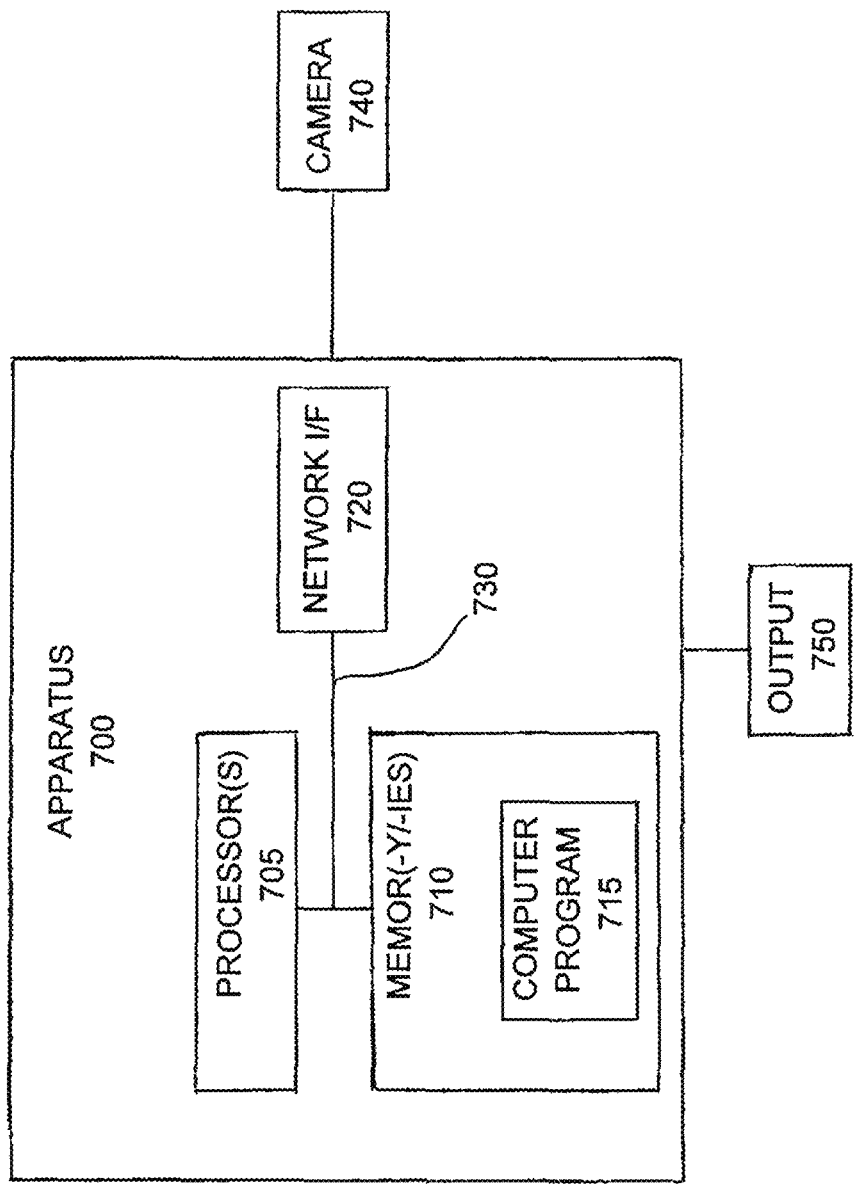
FIG. 7 is an exemplary system for practicing various exemplary embodiments.

FIG. 7 shows an exemplary system for practicing various embodiments of the present invention. The system includes an apparatus 700 having one or more processors 705, one or more memories 710, and one or more network interfaces 720, interconnected using one or more buses 730. The one or more memories 710 include a computer program 715 defined to cause the apparatus to perform one or more of the operations described herein.

Camera 740 provides input to the apparatus 700. A segmented image obtained by processing the image obtained by camera 740 in accordance with the process described above is sent to the output 750.

As will be appreciated by one skilled in the art, aspects of the present invention may be embodied as an apparatus, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module", or "system." Furthermore, aspects of the present invention may take the form of a computer program product embodied in one or more computer-readable medium(s) having computer-readable program code embodied thereon.

Any combination of one or more computer-readable medium/media may be utilized. The computer-readable medium may be a computer-readable signal medium or a computer-readable storage medium. A computer-readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, and so forth, or any suitable combination of the foregoing.

Computer program code for carrying out operations for aspects of the present invention may be written in any combination of one or more programming languages, including an object-oriented programming language, such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example, through the Internet using an Internet Service Provider.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable-medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any and all means or step plus function elements in the claims below are intended to include any structure, material, or act for performing the function in combination with other claimed elements as specifically claimed. The description of various embodiments has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various modifications and adaptations may become apparent to those skilled in the relevant arts in view of the foregoing description, when read in conjunction with the accompanying drawings. However, any and all modifications of the teachings of this disclosure will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope of the invention as set forth above, or from the scope of the claims to follow.

What is claimed is:

1. A method comprising:
   obtaining an image for segmentation, said image having a foreground and a background, said foreground having a boundary;
   forming a trimap of at least a portion of the image, the trimap being a three-region map having a definite foreground, a definite background, and an unknown region separating the foreground and the background, said unknown region having an initial preselected width;
   calculating a quality measure for the unknown region having the initial preselected width, the quality measure being a product of a texture uniformity of the unknown region and an amount of strong image edges encompassed by the unknown region;
   in a plurality of iterations, changing the width of the unknown region;
   for each of the plurality of iterations, calculating the quality measure for the unknown region; and
   selecting the width of the unknown region having the maximum quality measure to be the width of the unknown region for the segmentation.

2. The method as claimed in claim 1, wherein the quality measure is determined based on a color histogram and a count of border intersections.

3. The method as claimed in claim 1, wherein the width of the unknown region is increased for each successive iteration.

4. The method as claimed in claim 1, wherein the width of the unknown region is decreased for each successive iteration.

5. The method as claimed in claim 1, wherein the width of the unknown region is changed randomly for each successive iteration.

6. An apparatus comprising:
   at least one processor; and
   at least one memory including computer program code, wherein the at least one memory and the computer program code are configured, with the at least one processor, to cause the apparatus to perform:
   obtaining an image for segmentation, said image having a foreground and a background, said foreground having a boundary;
   forming a trimap of at least a portion of the image, the trimap being a three-region map having a definite foreground, a definite background, and an unknown region separating the foreground and the background, said unknown region having an initial preselected width;
   calculating a quality measure for the unknown region having the initial preselected width, the quality measure being a product of a texture uniformity of the unknown region and an amount of strong image edges encompassed by the unknown region;
   in a plurality of iterations, changing the width of the unknown region;
   for each of the plurality of iterations, calculating the quality measure for the unknown region; and
   selecting the width of the unknown region having the maximum quality measure to be the width of the unknown region for the segmentation.

7. The apparatus as claimed in claim 6, wherein the quality measure is determined based on a color histogram and a count of border intersections.

8. The apparatus as claimed in claim 6, wherein the width of the unknown region is increased for each successive iteration.

9. The apparatus as claimed in claim 6, wherein the width of the unknown region is decreased for each successive iteration.

10. The apparatus as claimed in claim 6, wherein the width of the unknown region is changed randomly for each successive iteration.

11. The apparatus as claimed in claim 6, further comprising at least one camera for use in obtaining the image.

12. An apparatus comprising:
    means for obtaining an image for segmentation, said image having a foreground and a background, said foreground having a boundary;
    means for forming a trimap of at least a portion of the image, the trimap being a three-region map having a definite foreground, a definite background, and an unknown region separating the foreground and the background, said unknown region having an initial preselected width;
    means for calculating a quality measure for the unknown region having the initial preselected width, the quality measure being a product of a texture uniformity of the unknown region and an amount of strong image edges encompassed by the unknown region;
    means for changing the width of the unknown region in a plurality of iterations;
    means for calculating the quality measure for the unknown region for each of the plurality of iterations; and
    means for selecting the width of the unknown region having the best maximum quality measure to be the width of the unknown region for the segmentation.

13. The apparatus as claimed in claim 12, wherein the quality measure is determined based on a color histogram and a count of border intersections.

14. The apparatus as claimed in claim 12, wherein the width of the unknown region is increased for each successive iteration.

15. The apparatus as claimed in claim 12, wherein the width of the unknown region is decreased for each successive iteration.

16. The apparatus as claimed in claim 12, wherein the width of the unknown region is changed randomly for each successive iteration.

17. The apparatus as claimed in claim 12, wherein the means for obtaining an image for segmentation is at least one camera.

18. A computer program product comprising a non-transitory computer-readable storage medium bearing computer program code embodied therein for use with a computer, the computer program code comprising code for performing:

obtaining an image for segmentation, said image having a foreground and a background, said foreground having a boundary;

forming a trimap of at least a portion of the image, the trimap being a three-region map having a definite foreground, a definite background, and an unknown region separating the foreground and the background, said unknown region having an initial preselected width;

calculating a quality measure for the unknown region having the initial preselected width, the quality measure being a product of a texture uniformity of the unknown region and an amount of strong image edges encompassed by the unknown region;

in a plurality of iterations, changing the width of the unknown region;

for each of the plurality of iterations, calculating the quality measure for the unknown region; and selecting the width of the unknown region having the maximum quality measure to be the width of the unknown region for the segmentation.

* * * * *